(12) United States Patent
Wampler, II

(10) Patent No.: US 7,900,898 B2
(45) Date of Patent: Mar. 8, 2011

(54) METHOD AND APPARATUS FOR FIXTURING A PANEL

(75) Inventor: Charles W. Wampler, II, Birmingham, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 11/871,337

(22) Filed: Oct. 12, 2007

(65) Prior Publication Data

US 2009/0096143 A1 Apr. 16, 2009

(51) Int. Cl.
*B23Q 3/00* (2006.01)

(52) U.S. Cl. ............ 269/152; 269/95; 269/45; 29/281.1; 29/559

(58) Field of Classification Search .................. 269/152, 269/91–95, 228, 201, 303; 29/281.1, 559
See application file for complete search history.

(56) References Cited

U.S. PATENT DOCUMENTS

| | | | |
|---|---|---|---|
| 2,054,572 A | | 9/1936 | McKenna |
| 3,035,831 A | | 5/1962 | Blatt |
| 4,108,589 A | * | 8/1978 | Bunch ........................... 425/393 |
| 5,435,533 A | * | 7/1995 | Weinmann, Jr. ............... 269/228 |
| 5,931,726 A | * | 8/1999 | Peters ........................... 451/305 |
| 6,003,851 A | * | 12/1999 | Araki et al. ................... 269/239 |
| 6,029,334 A | * | 2/2000 | Hartley ........................... 29/464 |
| 6,065,898 A | | 5/2000 | Hale |
| 6,116,588 A | * | 9/2000 | Yamane ......................... 269/228 |
| 6,163,946 A | * | 12/2000 | Pryor ........................... 29/407.04 |
| 6,301,763 B1 | * | 10/2001 | Pryor ........................... 29/407.04 |
| 6,729,589 B2 | | 5/2004 | Shelef |
| 6,932,335 B1 | * | 8/2005 | Dykstra ......................... 269/228 |
| 6,941,189 B2 | | 9/2005 | Linn et al. |
| 7,032,897 B2 | * | 4/2006 | Hausler, III ..................... 269/32 |
| 7,146,705 B2 | * | 12/2006 | Ahti et al. ........................ 29/563 |
| 7,182,328 B2 | * | 2/2007 | Teague et al. ................. 269/305 |
| 7,370,398 B2 | * | 5/2008 | Gosis et al. ................. 29/407.01 |
| 2009/0096143 A1 | * | 4/2009 | Wampler, II ................... 269/10 |

FOREIGN PATENT DOCUMENTS

DE 3107546 4/1986

OTHER PUBLICATIONS

Martin L. Culpepper, "Design of Quasi-Kinematic Couplings", Precision Engineering, 28 (2004) 338-357.
A. John Hart, Design and Analysis of Kinematic Couplings for Modular Machine and Instrumentation Structures, M. S. Thesis, MIT, Feb. 2002.
Alexander H. Slocum, Precision Machine Design, Society of Manufacturing Engineers, 1992.

* cited by examiner

*Primary Examiner* — Lee D Wilson
(74) *Attorney, Agent, or Firm* — Quinn Law Group, PLLC

(57) ABSTRACT

A fixturing apparatus for locating and supporting a panel, such as an automotive body panel is provided. The fixturing apparatus includes a support structure having at least three generally spherically shaped contactors. The panel includes at least three extending channels sufficiently configured to receive a respective one of the at least three generally spherically shaped contactors to locate and support the panel. At least one clamping arm is operable to selectively retain one of the at least three extending channels with respect to the respective one of the at least three generally spherically shaped contactors. A method of fixturing a panel employing the above described fixturing apparatus is also provided.

18 Claims, 3 Drawing Sheets

METHOD AND APPARATUS FOR FIXTURING A PANEL

TECHNICAL FIELD

The present invention relates to a method and apparatus for fixturing or locating and supporting a panel, such as an automotive body panel.

BACKGROUND OF THE INVENTION

Many automotive body panels are formed from multiple panels, therefore methods and apparatus for fixturing or locating and supporting the panels are required to ensure proper tolerances of the finished body panel. A typical panel fixturing apparatus includes a support structure such as a base plate having three or more substantially parallel flat contactors, a first locating pin of circular cross section, and a second locating pin of either circular or diamond cross section. The panel to be fixtured includes at least three substantially flat regions configured to engage a respective one of the flat contactors, a circular hole configured to engage the first location pin, and a slot configured to engage the second locating pin. The flat regions and flat contactors cooperate to establish a plane. Three flat regions and three flat contactors are typically sufficient to locate and support a rigid body; however, many panels may have sufficient flexibility thereby requiring additional flat regions and flat contactors to fully support the panel to avoid out of plane deformation. The circular hole and first locating pin cooperate to constrain translation of the panel within the plane, while the slot and second locating pin cooperate to constrain rotation of the panel about the first locating pin. Both the circular hole and the slot must be slightly oversized compared to the respective first and second locating pins to allow the panel to be inserted and removed from the fixturing apparatus.

SUMMARY OF THE INVENTION

A fixturing apparatus for locating and supporting a panel, such as an automotive body panel is provided. The fixturing apparatus includes a support structure having at least three generally spherically shaped contactors. The panel includes at least three extending channels sufficiently configured to receive a respective one of the at least three generally spherically shaped contactors to locate and support the panel. At least one clamping arm is operable to selectively retain one of the at least three extending channels with respect to the respective one of the at least three generally spherically shaped contactors.

A method of fixturing a panel employing the above described fixturing apparatus is also provided having the steps of: A) providing the first, second, and third extending channels on the panel; B) placing the panel on the support structure having the first, second, and third generally spherical contactors such that each of the first, second, and third extending channels receives a respective one of the first, second, and third generally spherical contactors to locate and support the panel; and C) clamping the panel to maintain engagement between said the first, second, and third generally spherical contactors and the first, second, and third extending channels.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
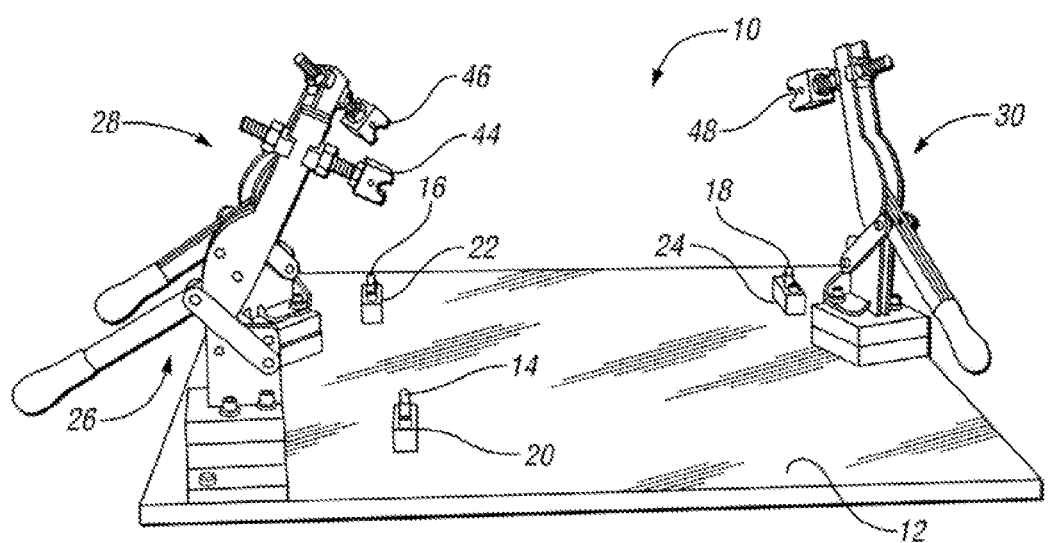
FIG. 1 is a perspective view of a fixturing apparatus.

Referring to the drawings wherein like reference numbers correspond to like or similar components throughout the several figures, there is shown in FIG. 1 a perspective view of a fixturing apparatus, generally indicated at 10. The fixturing apparatus 10 is configured to fixture or locate and support a panel 11, shown in FIG. 2, within space and includes a support structure, such as a base plate 12. The base plate 12 has first, second, and third generally spherical contactors 14, 16, and 18, respectively, mounted thereto. The first, second, and third generally spherical contactors 14, 16, and 18 may be of any type known in the art of fixture design such as a spherical contactor, "canoe ball" contactor, etc. Those skilled in the art will recognize that the combination of the form of contactor selected along with the shape of the portion of the panel in contact therewith will have an effect on the magnitude of Hertzian stresses imparted on the panel 11 when fixtured within the fixturing apparatus 10. A larger difference between the principal curvatures of the contactor and the panel at the point of contact will result in higher Hertzian stresses for a given applied force.

In a preferred embodiment, the first, second, and third generally spherical contactors 14, 16, and 18 will be spaced from one another such that they form a triangle whose area is generally the largest possible area of all triangles whose vertices lie within the projected area of panel 11 while avoiding interferences with other functional shape features of the panel 11 and with other panels that may be mounted adjacent to the panel 11 to be joined therewith during an assembly process. Those skilled in the art will recognize that alternate spacing strategy, such as equiangular spacing with respect to the centroid of the panel, may be employed for the first, second, and third generally spherical contactors 14, 16, and 18 while remaining within the scope of that which is claimed. A first mounting block 20, second mounting block 22, and third mounting block 24 are disposed between respective first, second, and third generally spherical contactors 14, 16, and 18 and the base plate 12 and operate to provide the required position to the first, second, and third generally spherical contactors 14, 16, and 18 to properly engage the panel 11 at its desired location in three dimensional translation and orientation with respect to the base plate 12. The first, second, and third mounting blocks 20, 22, and 24 may be replaced with robotic end-effectors to automatically shim the first, second, and third generally spherical contactors 14, 16, and 18 to the proper position as discussed hereinbelow with reference to FIG. 6.

Figure 2:
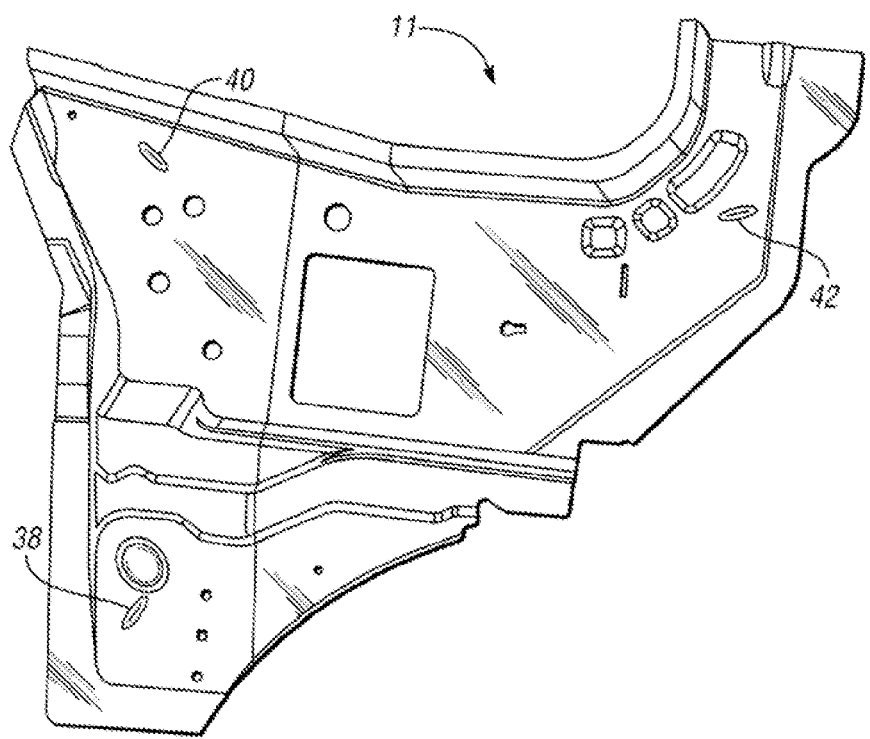
FIG. 2 is a plan view of an automotive body panel configured for use with the fixturing apparatus of FIG. 1.
Figure 3:
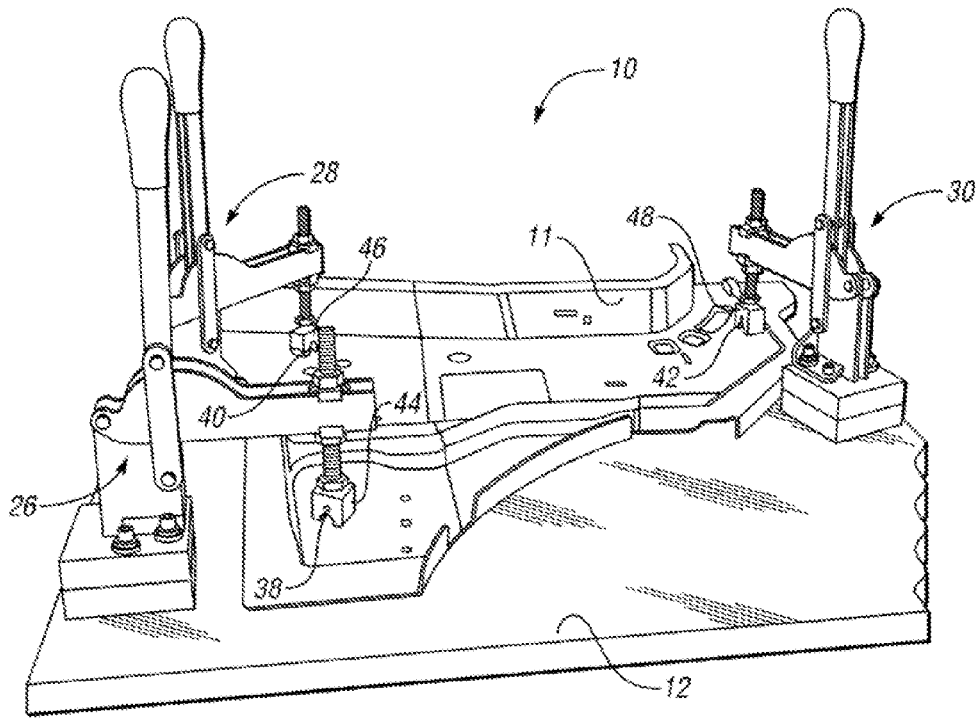
FIG. 3 is a perspective view of the fixturing apparatus of FIG. 1 having the automotive body panel of FIG. 2 mounted thereon.
Figure 6:
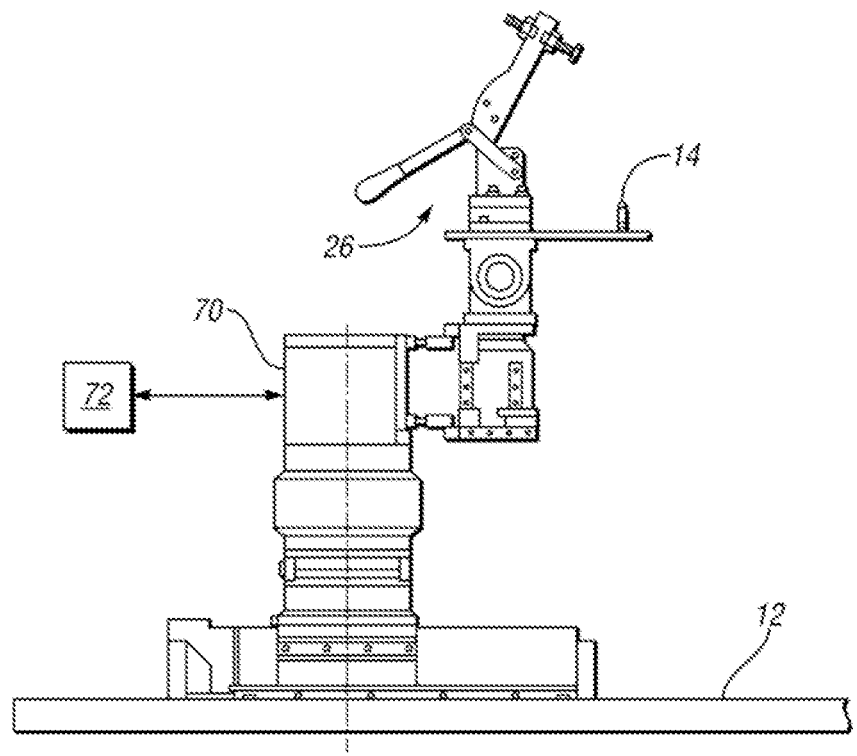
FIG. 6 is a side view of a positioning unit for use in an alternate embodiment of the positioning apparatus of FIGS. 1 and 3.

The fixturing apparatus 10 includes a first, second, and third clamping arm 26, 28, and 30, respectively, operable to maintain the panel 11 of FIG. 2 in relation to the respective first, second, and third generally spherical contactors 14, 16, and 18. The construction and operation of the first, second, and third clamping arm 26, 28, and 30 will be discussed in greater detail hereinbelow with reference to FIG. 4. The illustrations of the preferred embodiments in FIGS. 1, 3, and 6 show the first, second, and third clamping arms 26, 28, and 30 with handles for manual operation of the clamping mechanism. Those skilled in the art will recognize that in an automated manufacturing environment, the clamping mechanisms would preferably be actuated by air cylinders, electric motors, or other powered means while remaining within the scope of that which is claimed.

Referring to FIG. 2 and with continued reference to FIG. 1, the panel 11 is illustrated as an inner body panel for an automotive vehicle. The panel 11 is a sheet metal stamping; however, the panel 11 may be formed from other materials such as composites, plastics, etc. The panel 11 includes a first extending channel 38, second extending channel 40, and third extending channel 42 sufficiently configured to receive respective first, second, and third generally spherical contactors 14, 16, and 18. The first, second, and third extending channels 38, 40, and 42 and the first, second, and third generally spherical contactors 14, 16, and 18 cooperate to form a kinematic coupling or mounting thereby locating and securing the panel 11 in space. The first, second, and third extending channels 38, 40, and 42 are preferably generally V-shaped in cross section and are preferably formed integrally with the panel 11. Those skilled in the art will recognize that alternate cross section, such as a gothic arch profile, may be employed for the first, second, and third channels 38, 40, and 42 while remaining within the scope of that which is claimed. The long axis of the first, second, and third extending channels 38, 40, and 42 are preferably oriented along the angle bisectors of the triangle formed by the centers of the generally spherical contactors 14, 16, and 18.

Referring now to FIG. 3, there is shown the fixturing apparatus 10 with the panel 11 mounted thereon. The first, second, and third generally spherical contactors 14, 16, and 18, shown in FIG. 1, are engaged with respective first, second, and third extending channels 38, 40, and 42 thereby fixturing the panel 11. The first, second, and third clamping arms 26, 28, and 30 are engaged with the panel 11 to maintain the panel 11 with respect to the first, second, and third generally spherical contactors 14, 16, and 18. The first, second, and third clamping arm 26, 28, and 30 have a respective first, second, and third pressure foot 44, 46, and 48 mounted thereon and configured to engage the panel 11.

Figure 4:
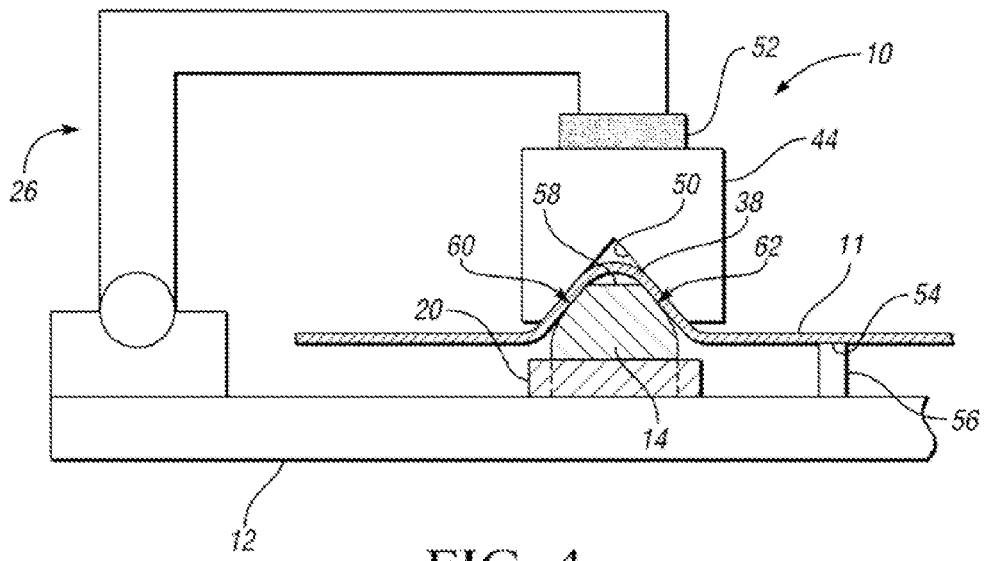
FIG. 4 is a schematic illustration of a clamping arm for use with the fixturing apparatus of FIGS. 1 and 3.

Referring now to FIG. 4, and with continued reference to FIGS. 1 through 3, there is shown a schematic depiction of a portion of the fixturing apparatus 10 illustrating the construction and operation of the first clamping arm 26 in greater detail. Although only the first clamping arm 26 is shown in FIG. 4, those skilled in the art will recognize that the same concepts may be applied to the second and third clamping arms 28 and 30. The first clamping arm 26 is shown engaged with the panel 11 to hold or maintain the first extending channel 38 in engagement with the first generally spherical contactor 14 thereby fixing and maintaining the panel 11 in position and counteracting any forces that may be imparted to the panel 11 during subsequent manufacturing operations, such as spot welding. A surface 50 of the first pressure foot 44 is preferably contoured to approximate the general contour of the panel 11 at the point of contact. A compliant member 52 is provided between the first clamping arm 26 and the first pressure foot 44 to ensure that the first pressure foot 44 fully engages the panel 11. The compliant member may be formed from an elastomeric material, such as rubber. Other methods of providing compliance between the first pressure foot 44 and the first clamping arm 26 may be employed, such as by allowing free or floating motion between the first pressure foot 44 and the first clamping arm 26 or by providing a spring member between the first pressure foot 44 and the first clamping arm 26, while remaining within the scope of that which is claimed.

The panel 11 may also include a flat portion 54 which is disposed generally parallel to the base plate 12 when the panel 11 is placed on the fixturing apparatus 10. A flat contactor 56 is mounted with respect to the base plate 12 and is configured to engage the flat portion 54 of the panel 11 thereby providing a measure of support to the panel 11. Those skilled in the art will recognize that additional flat portions 54 and flat contactors 56 may be employed as necessary to provide the requisite support to the panel 11.

The first generally spherical contactor 14 includes a flat portion 58 operable to provide clearance thus allowing the first generally spherical contactor 14 to engage the first extending channel 38 at a first and second contact point 60 and 62, respectively. It should be understood that the function of the generally spherical contactor 14 is to provide first and second contact points 60 and 62, so that the contactor may have any convenient shape away from contact points 60 and 62 to allow clearance between the panel 11 and contactor 14.

Figure 5:
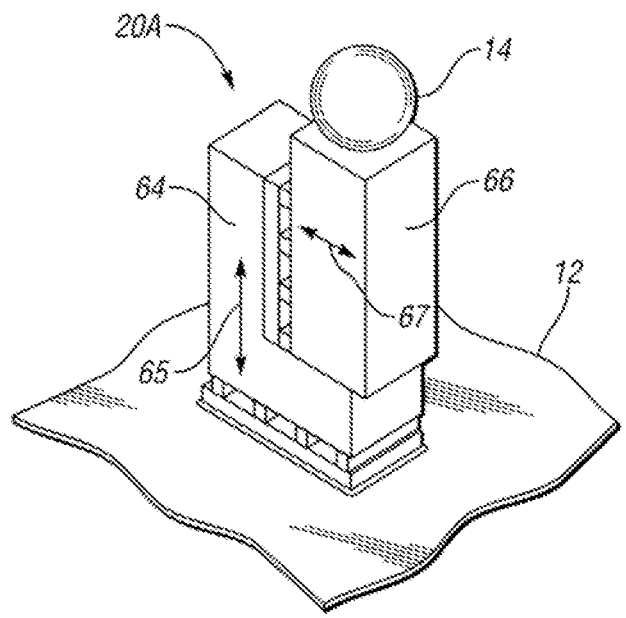
FIG. 5 is a perspective view of an adjustable shim unit for use with the fixturing apparatus of FIGS. 1 and 3.

Referring now to FIG. 5, and with continued reference to FIGS. 1 through 4, there is shown a shim unit 20A. The shim unit 20A may replace each of the first, second, and third mounting blocks 20, 22, and 24 in applications where spatial adjustment of the first, second, and third spherical contactors 14, 16, and 18 is required. The shim unit 20A will only be described as it applies to the first spherical contactor 14, it being understood that the same general structure and functionality may be used to position the second and third spherical contactors 16 and 18. The shim unit 20A includes a generally L-shaped member 64 translatably mounted with respect to the base plate 12 and movable in the direction of arrow 67. A locater block member 66 is translatably mounted with respect to the L-shaped member 64 and movable in the direction of arrow 65. The first spherical contactor 14 is mounted with respect to the locator block member 66. The shim unit 20A may be oriented such that the plane of motion it imparts to the first spherical contactor 14 is transverse to the long axis of the first extending channel 38. By employing the shim unit 20A in each of the positions of the first, second, and third mounting blocks 20, 22, and 24, the location of the panel 11 with respect to the base plate 12 can be adjusted in six degrees of freedom encompassing three dimensional translation and rotation.

In an alternate embodiment the first, second, and third mounting blocks 20, 22, and 24 may be replaced with motorized positioning units or end effectors, such as robots, to automatically shim or move the first, second, and third spherical contactors 14, 16, and 18 into position. Referring to FIG. 6 and with continued reference to FIGS. 1 through 4, there is shown a positioning unit 70 having the first spherical contactor 14 and the first clamping arm 26 mounted thereto. The positioning unit 70 is mounted to the base plate 12 and has a gross motion and a fine motion capability. Although only one positioning unit 70 is shown in FIG. 6, it should be understood that additional positioning units, not shown, may be employed to mount the second and third spherical contactors 16 and 18 and their respective second and third clamping arms 28 and 30. The gross motion capability of the positioning unit 70 is beneficial to move the first spherical contactor 14 into position to fixture a variety of panels each having a differing layout of extending channels analogous the first, second, and third extending channels 38, 40, and 42 of FIG. 2. The fine motion capability of the positioning unit 70 may be used to adjust the location of such panels in three dimensional position and orientation. This adjustment may be performed by sending appropriate commands via a controller 72 to the positioning unit 70. This includes the possibility of adjusting the location of a panel in real-time using automated measurement of the panel's location, such as by a variety of metrology devices including, for example, digital cameras, not shown, aided by laser generated structural light or stereoscopic digital camera pairs, not shown.

A method of fixturing the panel 11 is also provided having the steps of: A) providing the first, second, and third extending channels 38, 40, and 42 on the panel 11; B) placing the panel 11 on the base plate 12 having the first, second, and third generally spherical contactor 14, 16, and 18 such that each of the first, second, and third extending channels 38, 40, and 42 receives a respective one of the first, second, and third generally spherical contactor 14, 16, and 18 to locate and support the panel 11; and C) clamping the panel 11 with the first, second, and third clamping arms 26, 28, and 30 to maintain engagement between said the first, second, and third generally spherical contactor 14, 16, and 18 and the first, second, and third extending channels 38, 40, and 42. The panel 11 may be formed by stamping and the step of providing the first, second, and third extending channels 38, 40, and 42 on the panel 11 preferably includes integrally forming the first, second, and third extending channels 38, 40, and 42 on the panel 11 during stamping of the panel 11.

The fixturing apparatus 10 is operable to fully constrain the panel with only six contact points, i.e. two contact points for each of the first, second, and third generally spherical contactors 14, 16, and 18, with a high degree of repeatability thereby reducing part variation. Further, those skilled in the art will recognize that the first, second, and third extending channels 38, 40, and 42 may be contoured to more closely match the contour of the respective first, second, and third generally spherical contactor 14, 16, and 18, thereby reducing the Hertzian stresses imparted on the panel 11. Additionally, due to the surface-to-surface contact between the first, second, and third generally spherical contactors 14, 16, and 18 and the first, second, and third extending channels 38, 40, 42, respectively, a reduction in wear to the fixturing apparatus 10 may be achieved over conventional pin-type locating fixtures, which have edge-to-surface contact at the pins. By using standardized contactors to locate and support the panel 11, the use of relatively expensive panel specific machined locating blocks to locate and support the panel 11 is obviated. While the above description describes the present invention as it relates to automotive body panels, the fixturing apparatus 10 may be applied to fixture other types of panels, such as those used to form appliances.

While the best modes for carrying out the invention have been described in detail, those familiar with the art to which this invention relates will recognize various alternative designs and embodiments for practicing the invention within the scope of the appended claims.

The invention claimed is:

1. A fixturing apparatus in combination with a panel for locating and supporting the panel, comprising:
   a support structure having at least three generally spherically shaped contactors;
   wherein the panel includes at least three extending channels sufficiently configured to receive a respective one of said at least three generally spherically shaped contactors to locate and support the panel;
   at least one clamping arm having a contact portion that has a contour which corresponds to the contour of the at least three extending channels, wherein the contact portion is aligned with said respective one of said at least three generally spherically shaped contactors; and
   wherein said contact portion of said at least one clamping arm is operable to selectively retain one of said at least three extending channels on the panel with respect to said respective one of said at least three generally spherically shaped contactors.

2. The fixturing apparatus of claim 1, wherein said at least three extending channels are generally V-shaped in cross section, and wherein said contact portion of said at least one clamping arm is generally V-shaped in cross section, such that said respective one of said at least three extending channels contacts said respective one of said at least three generally spherically shaped contactors at two contact points.

3. The fixturing apparatus of claim 1, wherein said contact portion on the at least one clamping arm includes at least one pressure foot operable to engage the panel.

4. The fixturing apparatus of claim 3, wherein said at least one clamping arm includes a compliant member disposed between said at least one clamping arm and said at least one pressure foot.

5. The fixturing apparatus of claim 1, wherein said support structure includes three generally spherically shaped contactors and wherein each of said generally spherically shaped contactors are arranged generally equiangularly with respect to their centroid.

6. The fixturing apparatus of claim 1, wherein said at least three extending channels are formed integrally with the panel.

7. The fixturing apparatus of claim 1, wherein the panel is formed from sheet metal.

8. The fixturing apparatus of claim 1, further comprising:
   at least one flat contactor mounted with respect to said support structure; and
   wherein the panel includes at least one flat portion operable to engage a respective one of said at least one flat contactor to provide support to the panel.

9. A fixturing apparatus in combination with an automotive body panel for locating and supporting the automotive body panel, comprising:
   a support structure having at least three generally spherically shaped contactors;
   wherein the automotive body panel includes at least three extending V-shaped channels sufficiently configured to receive a respective one of said at least three generally spherically shaped contactors to locate and support the automotive body panel;
   at least one clamping arm operable to selectively retain one of said at least three extending V-shaped channels with respect to said respective one of said at least three generally spherically shaped contactors, such that said respective one of said at least three extending V-shaped channels contacts said respective one of said at least three generally spherically shaped contactors at two contact points; and
   wherein said at least one clamping arm includes at least one V-shaped pressure foot aligned with said respective one of said at least three generally spherically shaped contactors and operable to engage the automotive body panel.

10. The fixturing apparatus of claim 9, wherein said at least one clamping arm includes a compliant member disposed between said at least one clamping arm and said at least one pressure foot.

11. The fixturing apparatus of claim 9, wherein said at least three extending channels are formed integrally with the automotive body panel.

12. The fixturing apparatus of claim 9, wherein the automotive body panel is formed from sheet metal.

13. The fixturing apparatus of claim 9, further comprising:
at least one flat contactor mounted with respect to said support structure; and
wherein the automotive body panel includes at least one flat portion operable to engage a respective one of said at least one flat contactor to provide support to the automotive body panel.

14. A method of fixturing a panel comprising:
providing at least three extending channels on the panel; and
placing the panel on a support structure having at least three generally spherically shaped contactors such that each of said at least three extending channels receives a respective one of said at least three generally spherically shaped contactors to locate and support the panel;
aligning a contact portion of at least one clamping arm with said respective one of said at least three generally spherically shaped contactors;
selectively engaging the panel with said contact portion of said at least one clamping arm to selectively retain one of said at least three extending channels on the panel with respect to said respective one of said at least three generally spherically shaped contactors, wherein said contact portion of said at least one clamping arm has a contour corresponding to the contour of said at least three extending channels.

15. The method of claim 14, further comprising clamping the panel to maintain engagement between said at least three generally spherically shaped contactors and said at least three extending channels, such that the panel contacts each of said at least three generally spherically shaped contactors at two contact points.

16. The method of claim 14, wherein the panel is stamped and wherein providing said at least three extending channels on the panel includes integrally forming said at least three extending channels on the panel during stamping of the panel.

17. The method of claim 16, wherein the panel is formed from sheet metal.

18. The method of claim 14, wherein the panel is an automotive body panel.

\* \* \* \* \*